United States Patent
Karri et al.

(10) Patent No.: US 12,056,041 B2
(45) Date of Patent: Aug. 6, 2024

(54) TESTING VIRTUAL REALITY INTEGRATION WITH A DEVELOPMENT ENVIRONMENT

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Kamal Kiran Trood Yamala, Visakhapatnam (IN); Dasavatara Yadav Golagani, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 17/446,309

(22) Filed: Aug. 30, 2021

(65) Prior Publication Data

US 2023/0063753 A1   Mar. 2, 2023

(51) Int. Cl.
*G06F 9/44* (2018.01)
*G06F 3/0481* (2022.01)
(Continued)

(52) U.S. Cl.
CPC ........ *G06F 11/3664* (2013.01); *G06F 3/0481* (2013.01); *G06F 11/3688* (2013.01);
(Continued)

(58) Field of Classification Search
CPC .............. G06F 11/3664; G06F 3/0481; G06F 11/3688; G06F 11/3692; G06T 15/005; G06T 2200/24
See application file for complete search history.

(56) References Cited

U.S. PATENT DOCUMENTS

| 2004/0135820 | A1* | 7/2004 | Deaton | G06F 16/954 715/848 |
| 2007/0211065 | A1* | 9/2007 | Feth | G06T 19/00 345/522 |

(Continued)

OTHER PUBLICATIONS

Disclosed Anonymously, "Method and System for Virtual Reality Gamification-Based Fixing of Application Defects", An IP.com Prior Art Database Technical Disclosure, IP.com No. IPCOM000265113D, IP.com Electronic Publication Date: Feb. 26, 2021, 5 pages.

*Primary Examiner* — Hang Pan
(74) *Attorney, Agent, or Firm* — Joseph P. Curcuru

(57) ABSTRACT

In an approach to improve virtual Reality (VR) integrated development environment (IDE) embodiments create an integrated view of a developed code during integration testing based on received artificial intelligent enabled IDE, and execute a test case simulation during the integrated visualization of the developed code in a virtual reality environment. Further, embodiments create a visualization of the developed code based on one or more test results from the test case simulation in the VR environment and a selected code from the developed code with respect to an entire application landscape, and identify one or more problematic areas based on one or more types of defect and criticality of the defect in the developed code. Additionally, embodiments, display the visualization of the selected code, and apply one or more identified solutions to the one or more identified problematic areas in the developed code.

20 Claims, 3 Drawing Sheets

(51) Int. Cl.
*G06F 11/36* (2006.01)
*G06T 15/00* (2011.01)

(52) U.S. Cl.
CPC ........ *G06F 11/3692* (2013.01); *G06T 15/005* (2013.01); *G06T 2200/24* (2013.01)

(56) References Cited

U.S. PATENT DOCUMENTS

| | | | |
|---|---|---|---|
| 2011/0271253 A1* | 11/2011 | Bnayahu | G06F 11/3676 717/124 |
| 2015/0160926 A1* | 6/2015 | Larson | G06F 8/34 717/100 |
| 2017/0109933 A1 | 4/2017 | Voorhees et al. | |
| 2019/0079754 A1* | 3/2019 | Makkar | G06F 8/71 |
| 2019/0278697 A1 | 9/2019 | Sharma | |
| 2019/0303110 A1* | 10/2019 | Brude | G06F 3/0484 |

* cited by examiner

TESTING VIRTUAL REALITY INTEGRATION WITH A DEVELOPMENT ENVIRONMENT

BACKGROUND OF THE INVENTION

The present invention relates generally to the field of integrated development environments, and more particularly to virtual reality integration testing through integrated development environment.

An integrated development environment (IDE) is a software application that provides comprehensive facilities to computer programmers for software development. An IDE normally consists of at least a source code editor, build automation tools and a debugger. Some IDEs contain a compiler, interpreter, or both, while other IDEs do not. The boundary between an IDE and other parts of the broader software development environment is not well-defined, sometimes a version control system or various tools to simplify the construction of a graphical user interface (GUI) are integrated. Many modern IDEs also have a class browser, an object browser, and a class hierarchy diagram for use in object-oriented software development.

Virtual reality (VR) is a simulated experience that can be similar to or completely different from the real world. Applications of virtual reality include entertainment (e.g. video games), education (e.g. medical or military training) and business (e.g. virtual meetings). Other distinct types of VR-style technology include augmented reality (AR) and mixed reality, sometimes referred to as extended reality (XR). Currently, standard virtual reality systems use either virtual reality headsets or multi-projected environments to generate realistic images, sounds and other sensations that simulate a user's physical presence in a virtual environment. A user using virtual reality equipment is able to look around the artificial world, move around in it, and interact with virtual features or items. The effect is commonly created by VR headsets consisting of a head-mounted display with a small screen in front of the eyes, but can also be created through specially designed rooms with multiple large screens. Virtual reality typically incorporates auditory and video feedback, but may also allow other types of sensory and force feedback through haptic technology.

SUMMARY

Embodiments of the present invention disclose a computer-implemented method, a computer program product, and a system for generating a visualization of a developed code in a Virtual Reality (VR) integrated development environment (IDE), the computer-implemented method comprising: creating an integrated view of a developed code during integration testing based on received artificial intelligent enabled IDE; executing a test case simulation during the integrated visualization of the developed code in a virtual reality environment; creating a visualization of the developed code based on one or more test results from the test case simulation in the VR environment, wherein the created visualization of the developed code enables a user to visually observe and understand one or more problems in the developed code during the integration testing; creating a visualization of a selected code from the developed code with respect to an entire application landscape based on received data from one or more upstream and downstream applications; identifying one or more problematic areas and areas where fixing is required based on types of defect and criticality of the defect in the developed code; displaying, by a computing device, the visualization of the selected code, wherein the visualization of the selected code depicts the one or more identified problematic areas; and applying one or more identified solutions to the one or more identified problematic areas in the developed code.

DETAILED DESCRIPTION

Figure 1:
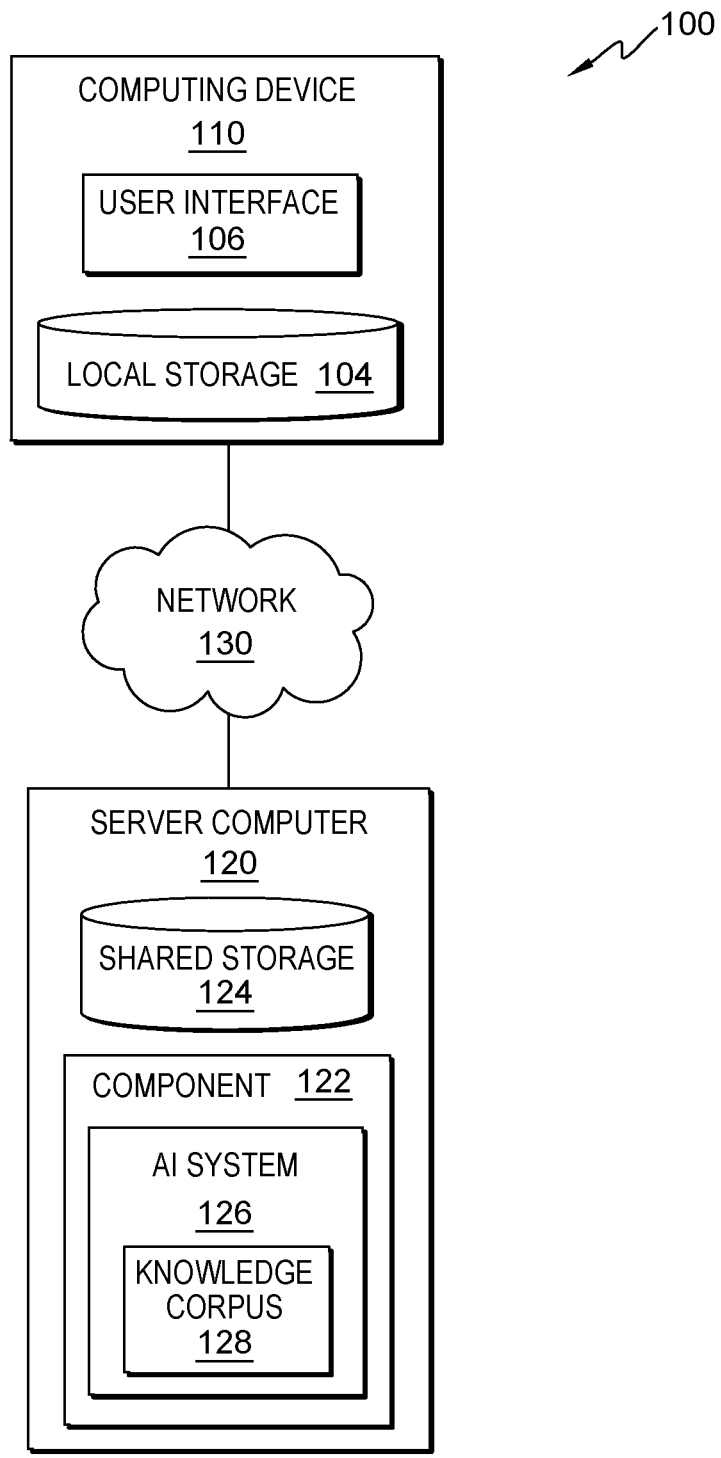
FIG. 1 is a functional block diagram illustrating a distributed data processing environment, in accordance with an embodiment of the present invention.

A development environment is a collection of procedures and tools for developing, testing and debugging an application or program. An integrated development environment (IDE) enables users to consolidate the different aspects of writing a computer program. Embodiments of the present invention recognize that IDE's increase a user's productivity by combining common activities of writing software into a single application: editing source code, building executables, and debugging. Further, embodiments of the present invention recognize that in an IDE a user can write software and/or program code (i.e., code) and also can use graphical interface to write code. It should be noted that the term "code" and any various of the term "code" refer to any type of process in relation to creating instructions for computers using programming languages as it is known and understood in the art.

Embodiments of the present invention recognize that when development is complete or in progress, the application needs integration testing, during integration testing, we need to test along with other applications in the application landscape and the complete testing of the application, many time, it is difficult to visualize and understand how the integration testing will be performed. Embodiments of the present invention solve the particular issues above by creating equivalent visualization of developed code during integration testing so that enables a user to visualize where appropriate correction is to be applied. Embodiments of the present invention solve the issues above and improves the current art by analyzing requirement specifications, testcases, acceptance success criteria and the developed code, and accordingly be creating a comparative visualization of the developed code to identify if code is properly developed, where the correction is to be applied, and will be creating an end to end Integration of the application with other applications in the application landscape.

Additionally, embodiments of the present invention solve the issues above and improves the current art by: (i) providing AI enabled IDE for analyzing requirement specifications (functional and non-functionals), test cases, acceptance criteria and developed code, unit testing results, application log and accordingly creating a holistic integrated view of the developed code during integration testing, (ii) creating appropriate visualization of the developed code by considering previous experience of developers on different types of visualization, and accordingly creating equivalent visualization of the integrated code (e.g. Data Processing can be visualized with Pipeline arrangement, and flow of fluid will be representing data flow, and will be showing where the data flow will be having problem and where data flow will be smooth etc.), (iii) simulating the test cases during integrated visualization of the developed code and creating appropriate visualization of the developed code based on the test result in VR environment to help the developer to understand problem in the developed code during integration testing, (iv) receiving information from upstream and downstream applications and accordingly creating a visualization of the selected code base with respect to entire application landscape, and allowing the developer to perform mobility from one application to another application, (v) creating appropriate visualization of the application based on the test results in the VR surrounding to help developer to identify problematic area in the developed code and area where fixing is required based on types of defect and criticality of the defect, (vi) and enabling the developer to apply fixes and accordingly updating code base dynamically in the AI enabled Virtual Reality IDE, wherein applied fixes includes scheduling changes, correcting integration sequence, changing of configurations or fixing of defects. A problematic area can be defect in the code, which is cause improper results, like improper code is creating wring calculation, and as wrong calculation, so it is creating problem with integration with other application, and wrong data is flowing, so VR system will be showing appropriate visualization, like through pipe line dirty water is flowing to other area (other area means another application).

Implementation of embodiments of the invention may take a variety of forms, and exemplary implementation details are discussed subsequently with reference to the Figures (i.e., FIG. 1-FIG. 3).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), augmented reality (AR) device, a VR device, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 3.

User interface (interface) 106 provides an interface to virtual reality integration component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 3 In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1, in addition to shared storage 124, server computer comprises a primary and a secondary database, described below in FIG. 3. The primary database, also referred to as primary storage device, may be one or more of any type of disk storage known in the art. The secondary database, also referred to as secondary storage device, may be one or more any type of tape storage known in the art.

In the depicted embodiment, component 122 is executed on server computer 120. In other embodiments, component 122 may be executed on computing device 110. In various embodiments of the present invention, not depicted in FIG. 1, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130. In the depicted embodiment, component 122 comprises artificial intelligent (AI) system 126 and knowledge corpus 128. In some embodiments, knowledge corpus 128 may be shared storage 124.

In various embodiments of the present invention, not depicted in FIG. 1, AI system 126 and knowledge corpus 128 may each execute on a plurality of server computers 120 and/or on a plurality of computing devices 110. In some embodiments, AI system 126 and knowledge corpus 128 may each be located and/or executed anywhere within distributed data processing environment 100 as long as AI system 126 and/or knowledge corpus 128 are connected to and/or communicates with, computing device 110, component 122, and/or server computer 120, via network 130.

In various embodiments, during integration testing of one or more software codes or during one or more software developments, component 122 analyzes one or more specifications (functional and non-functionals), testcases, acceptance criteria and developed code, unit testing results, and application log. In various embodiments, component 122, based on the analysis, creates a comparative visualization of the entire developed code so that the developer can have a holistic integrated view of the developed code in the visualization. In some embodiments, while creating appropriate visualization of the developed code, component 122 considers one or more previous experiences of a user in relation to different types of visualizations, and creates equivalent visualization of the integrated code (e.g. Data Processing can be visualized with Pipeline arrangement, and flow of fluid will be representing data flow based on the considered previous experiences of the user), wherein the visualization displays where component 122 identifies the data flow will have problem/issue and where data flow will run smoothly.

In various embodiments, during integrated visualization of the software code, component 122 simulates the test cases, wherein based on the test result, component 122 creates one or more visualizations, also referred to as appropriate visualizations, in VR environment to help the developer to understand problems within the code during integration. In some embodiments, appropriate visualizations are user selected or predetermined visualizations. Visualization may represent how a user (e.g., a developer) wants to visualize a particular item, system, object, and/or idea in a simulated visual environment (e.g., virtual reality and/or augmented reality). For example, visualizing the integration of an application with pipe fitting, roller coaster, and/or book shelfs, in a simulated visual environment, based on types of integration. The developer can also select appropriate mode of visualization, so the application integration will be translated to different types of simulated visual environment.

In some embodiments, while creating integrated visualization, component 122 receives information from upstream and downstream applications. Based on the received information from the upstream and downstream applications component 122 may create a visualization of the selected code base on the entire application landscape, wherein component 122 enables a user (e.g., a developer) to perform mobility between two or more applications. In various embodiments, based on the test results, component 122 will create appropriate visualization of the application in the VR surrounding to enable a user to interact with the problematic area (i.e., area where fixing/repair is required). Based on the type and criticality of the defect component 122 may create one or more appropriate visualizations. In some embodiments, component 122 generates and outputs a ranked list of visualizations based on the type and criticality of the identified defects, wherein the ranked list lists the generated visualizations based on predetermined parameters.

In various embodiments, via AI enabled VR IDE, component 122 applies one or more identified and/or received solutions to fix the one or more identified defects. In some embodiments, component 122 dynamically updates the codebase with the applied one or more solutions (i.e., fixes). In various embodiments, the applied fixes can be scheduling changes, correcting integration sequence, configurations changes and/or also fixing of the defects. In various embodiments, component 122 generates and displays one or more responsive prompts, via interface 106, to a user, wherein the one or more responsive prompts are interactive and enable component 122 to receive instructions and user feedback to apply one or more solutions to the one or more identified defects. In various embodiments, component 122 enables one or more users to apply one or more solutions (i.e., fixes). The defect can be a problem with the integration and/or the code, wherein the defect can be visualized. For example, if a pipe fitting visualization is illustrating the integration, and there is a problem with integration, then the visualization will display two offset pipelines, wherein the offset pipelines are unable to join two pipes. In this example, the two ends of the pipes represent two different applications where integration is required In various embodiments, component 122 identifies one or more codebases uniquely through the functionality of the code and code analysis tools to identify sections of the code that correlate to a particular action. Component 122 may identify and store various details about the one or more codebases, wherein the identified and stored various details are predetermined. In some embodiments, component 122 assigns a unique identification number to a codebase based on the identified predetermined details. Component 122 may identify one or more functionality test results of one or more code files in a codebase. Further, in various embodiments, component 122 may identify one or more code scanning results (e.g., functionalities, non-functionalities, and/or security testing) and may identify various functionalities of the code based on the identified one or more code scanning results. In various embodiments, component 122 identifies how the codes are sequenced, and how the code will be executed. For example, component 122 will create a visualization of the retrieved and/or received code in a manner that enables the user to understand how the code is connected to each integration. In various embodiments, component 122 may comprise AI system 126, as it is known and understood in the art, wherein AI system 126 comprises knowledge corpus 128. In various embodiments, component 122, via knowledge corpus 128, creates one or more virtual reality visualizations of the one or more code files.

In various embodiments, component 122 stores the created one or more virtual reality visualizations. In some embodiments, component 122 compares the stored virtual reality visualizations and stores the different comparative visualization utility, wherein the comparative visualization enables component 122 to display one or more applications in various user-friendly manners. For example, data processing (ETL) is represented by a Pipeline that allows fluids to flow through it and server management is depicted as a bookshelf. In various embodiments, AI knowledge corpus 128 comprises different types of representation of processed code (e.g., amount of data processing, and types of data). In various embodiments, component 122 receives the functional and technical specification of the requirement, and non-functional requirements. Component 122 may identify how the application is to be integrated, and which application will be part of the integration testing. In various embodiments, component 122 receives defined application integration from one or more users. In some embodiments, component 122 identifies application integration in relation to one or more applications based on the functionalities of the application and architecture diagram. In various embodiments, component 122 may identify how the application is developed, like how the jobs are scheduled, what types of data will be processed frequency of data processing. Component 122 may receive the functional and non-functional requirements from one or more applications which may be part of the integration testing.

In various embodiments, during integration testing of one or more applications, component 122 identifies the detail of the current application and potential applications that are queued to part of the integration testing. Component 122 may gather test cases and acceptance criteria from the applications that are or will be part of the integration testing. In various embodiments, Component 122 may have an automated testing system, wherein the automated testing utilities perform the integration testing. Manual testing feed may be considered by component 122, via AI visualization system 126. In various embodiments, component 122 historically identified developer's interaction and creates equivalent visualizations. The integration result may be simulated through virtual reality simulation (e.g., computing device 110), and may enable a user to visualize the application integration in the virtual reality surrounding. In various embodiments, component 122 enables a user to visualize where there is a problem with application integration, via a generated virtual reality environment displayed on or through computing device 110, wherein the generated and displayed virtual reality environment enables a user to identify the issues in the code. In some embodiments, component 122 enables a user to navigate the VR environment, via computing device 110, and enable the user to execute remedies to the identified issues in the VR environment in the same manner the user would implement in the code. In various embodiments, component 122 guides the user through solution implementation (i.e., solutions instructions) via responsive prompts, annotations, and/or step by step instructions, wherein the generated solution instructions are displayed and output on computing device 110. In various embodiments, during navigation with the VR surrounding, component 122 enables one or more users to fix the defect, wherein fix (i.e., solution implementation) is simulated in the VR environment.

Figure 2:
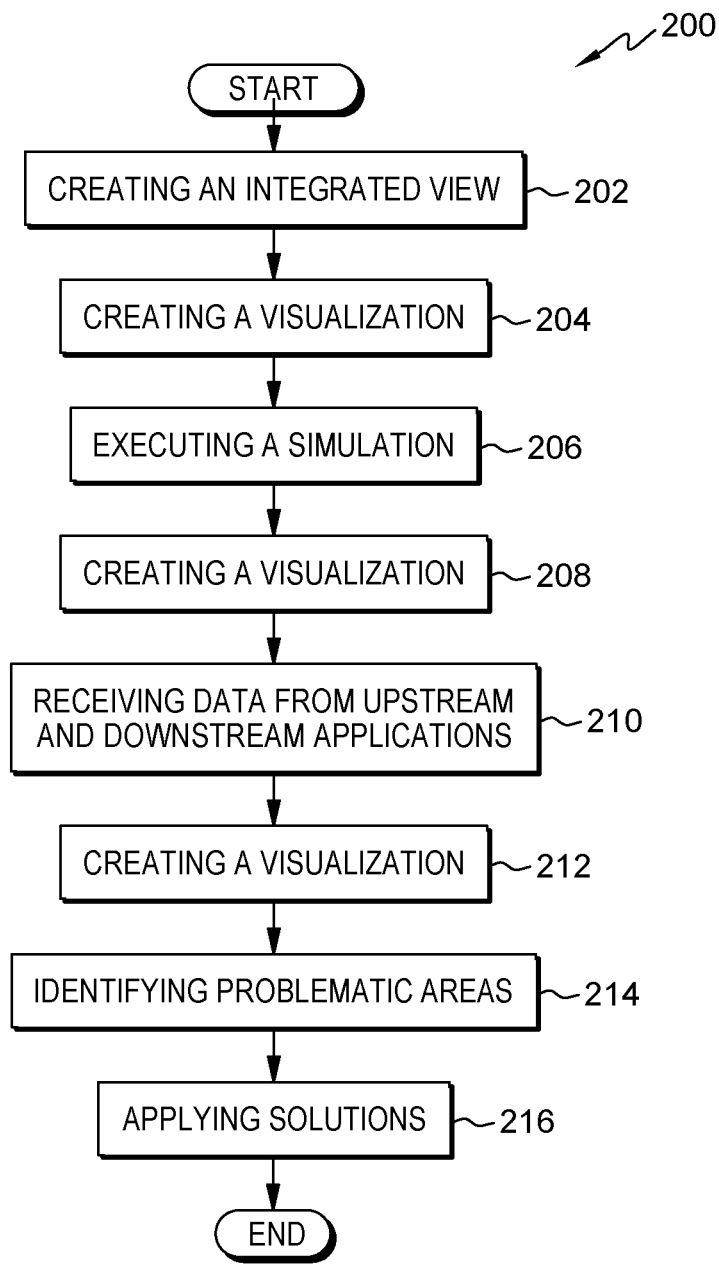
FIG. 2 illustrates operational steps of a virtual reality integration component, on a server computer within the distributed data processing environment of FIG. 1, for generating a visualization of a developed code in a Virtual Reality (VR) integrated development environment (IDE), in accordance with an embodiment of the present invention.

FIG. 2 illustrates operational steps of component 122, generally designated 200, in communication with server computer 120, within distributed data processing environment 100 of FIG. 1, for generating a visualization of a developed code in a Virtual Reality (VR) integrated development environment (IDE), in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, component 122 creates an integrated view of one or more developed codes during integration testing. In various embodiments, component 122 creates an integrated view of developed code during integration testing based on received and/or retrieved AI enabled IDE for analyzing requirement specifications (functional and non-functionals), test cases, acceptance criteria and developed code, unit testing results, and one or more application logs.

In step 204, component 122 creates a visualization of one or more developed codes. In various embodiments, component 122 creates one or more visualizations of the developed code by considering previously stored experiences of users, wherein the previously stored experiences comprise various types of visualization, wherein the various types of visualizations comprise predetermined and custom visualizations. In various embodiments, component 122 creates equivalent visualization of the integrated code (e.g. Data Processing can be visualized with Pipeline arrangement, and flow of fluid will be representing data flow, and will be showing where the data flow will be having problem and where data flow will be smooth) based on the created visualization of developed code.

In step 206, component 122 executes a test case simulation. In various embodiments, component 122 executes a test case simulation during the integrated visualization of the developed code.

In step 208, component 122 creates a visualization of the developed code based on the test results of the simulation. In various embodiments, component 122 creates a visualization of the developed code based on the test result in VR environment, wherein the created visualization enables a user to understand one or more problems in the developed code during integration testing. Component 122 may display, via a VR environment through computing device 110, visual differences that depict what portions of the code are unable to be integrated. In various embodiments, component 122 creates a visualization of the application based on the test results in the VR surrounding to help developer to identify problematic area in the developed code and area where fixing is required based on types of defect and criticality of the defect. For example, there are two pipes labeled pipe A and pipe B, wherein pipe A represents portion Y of the code and pipe B represents portion Z of the code. If portion Y needs repair (i.e., is defective during integration) then pipe A will be displayed virtually as being offset and disconnected from pipe B indicating that pipe A needs "repair." In another example, if a first file has been identified as possessing a high flow rate and a second file has been identified as having a low flow rate than component 122 will display a first pipe with a wide connection and a second pipe with a narrow connection to indicate that the first and second file need tuning.

In step 210, component 122 receives data from upstream and downstream applications. In various embodiments, component 122 receives and/or retrieves data from upstream and downstream applications.

In step 212, component 122 creates a visualization of selected coded. In various embodiments of the present invention, component 122 creates a visualization of a selected code base with respect to entire application landscape based on the received data from the upstream and downstream applications, wherein the created visualization of the selected code base enables one or more users to perform mobility between two or more applications. A visualization may demonstrate an application integration depicted by pipe fitting, and data flow illustrated by water flowing through the pipe fitting. If the pipe fitting is not proper, then the flow of water will also not be proper, which may result in dirty water.

In step 214, component 122 identifies problematic areas in the developed code. In various embodiments, component 122 identifies one or more problematic areas and areas where fixing is required based on types of defect and criticality of the defect in the developed code.

In step 216, component 122 applies solutions. In various embodiments, component 122 applies one or more identified solutions to the one or more identified problematic areas in the developed code. In various embodiments, component 122 enables one or more users to apply the one or more solutions to the one or more problematic areas. In some embodiments, component 122 dynamically updates the developed code base the AI enabled Virtual Reality IDE, wherein applied solutions includes scheduling changes, correcting integration sequence, changing of configurations or fixing of defects.

Figure 3:
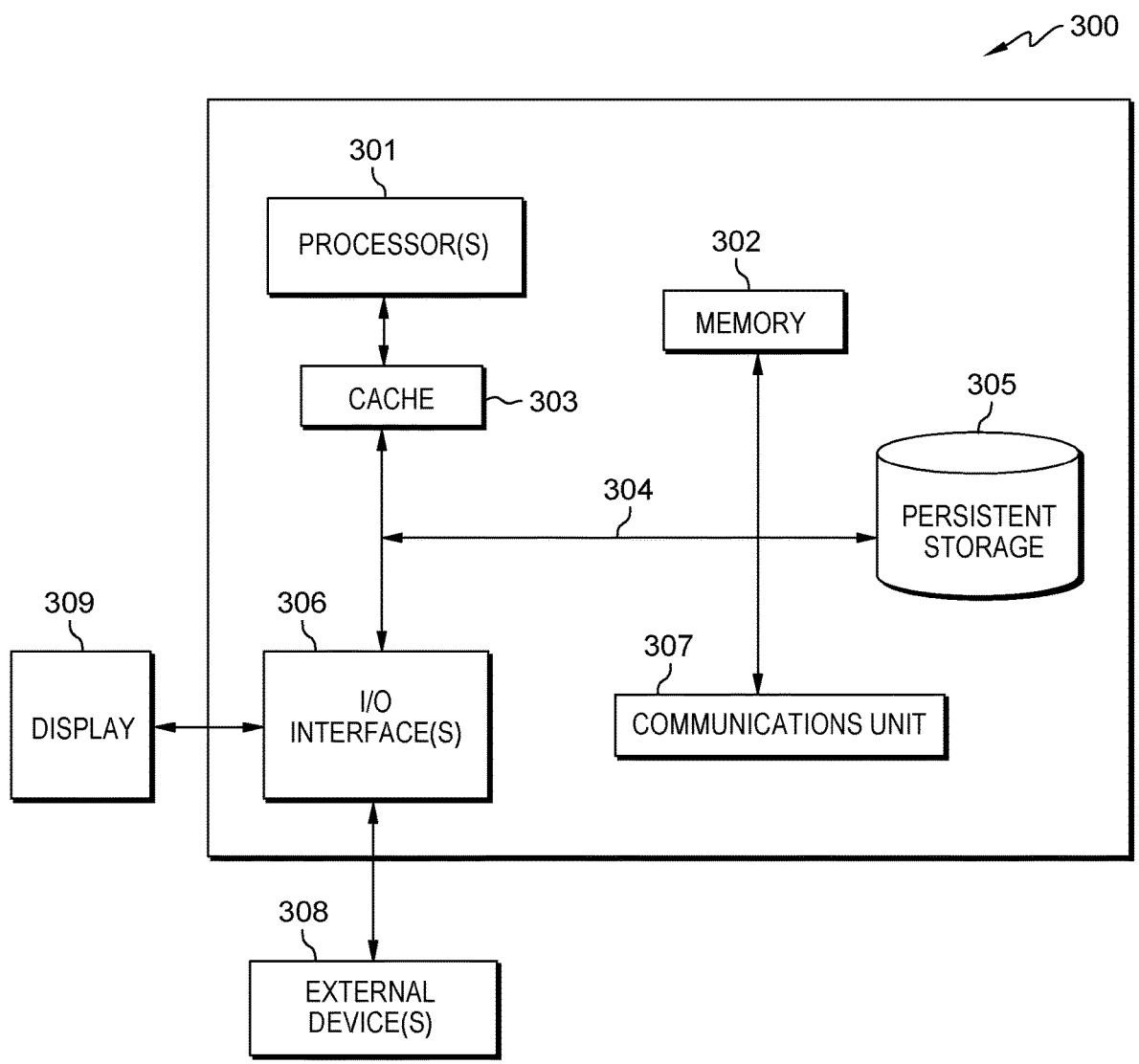
FIG. 3 depicts a block diagram of components of the server computer executing the virtual reality integration component within the distributed data processing environment of FIG. 1, in accordance with an embodiment of the present invention.

FIG. 3 depicts a block diagram of components of server computer 120 within distributed data processing environment 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 depicts computer system 300, where server computing 120 represents an example of computer system 300 that includes component 122. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 may be implemented with any architecture designed for passing data and/or control information between processors (such as microprocessors, communications, and network processors, etc.), system memory, peripheral devices, and any other hardware components within a system. For example, communications fabric 304 may be implemented with one or more buses or a crossbar switch.

Memory 302 and persistent storage 305 are computer readable storage media. In this embodiment, memory 302 includes random access memory (RAM). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 enables for input and output of data with other devices that may be connected to each computer system. For example, I/O interface 306 may provide a connection to external devices 308 such as a keyboard, keypad, a touch screen, and/or some other suitable input device. External devices 308 may also include portable computer readable storage media such as, for example, thumb drives, portable optical or magnetic disks, and memory cards. Software and data used to practice embodiments of the present invention may be stored on such portable computer readable storage media and may be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating a visualization of a developed code in a Virtual Reality (VR) integrated development environment (IDE), the computer-implemented method comprising:
   uniquely identifying a codebase of a developed code through a functionality of the codebase and a code analysis tool to identify sections of the codebase that correlate to a particular action;
   assigning a unique identification number to the codebase based on one or more identified predetermined details;
   creating an integrated view of a developed code during integration testing based on received artificial intelligent enabled IDE;
   executing a test case simulation during an integrated visualization of the developed code in a virtual reality environment;
   creating a comparative visualization of the developed code based on one or more test results from the test case simulation in the VR environment to identify errors in the developed code, wherein the comparative visualization of the developed code enables a user to visually observe and understand one or more problems in the developed code during the integration testing, and wherein the comparative visualization is data processing visualized as a pipeline arrangement and a data flow is represented by a flow of fluid through the pipeline arrangement and server management is depicted as a bookshelf;
   creating a visualization of a selected code from the developed code with respect to an entire application landscape based on received data from one or more upstream and downstream applications, wherein the visualization demonstrates an application integration depicted by an exemplary system or object that depicts features and attributes of the application integration;
   identifying one or more problematic areas and areas where fixing is required based on types of defect and criticality of the defect in the developed code;
   displaying, by a computing device, the visualization of the selected code, wherein the visualization of the selected code depicts the one or more identified problematic areas;
   applying one or more identified solutions to the one or more identified problematic areas in the developed code and dynamically updating the code base, wherein applying one or more identified solutions comprise: scheduling changes, correcting integration sequence, changing of configurations, and fixing of defects; and
   creating an end-to-end integration of a first application to one or more second application in the entire application landscape.

2. The computer-implemented method of claim 1, further comprising:
   creating one or more visualizations of the developed code based upon previously stored experiences of users, wherein the previously stored experiences comprise various types of visualization, wherein the various types of visualizations comprise predetermined and custom visualizations.

3. The computer-implemented method of claim 1, wherein the artificial intelligent enabled IDE analyzes functional and non-functional specifications, test cases, acceptance criteria and the developed code, unit testing results, and one or more application logs, and wherein based on the analysis, creates a comparative visualization of the entire developed code so that the developer can have a holistic integrated view of the developed code in the visualization.

4. The computer-implemented method of claim 1, further comprising:
   outputting, by a user interface, the one or more identified solutions to the user, wherein outputting comprises:
      displaying, by the user interface, one or more responsive prompts to the user, wherein the one or more responsive prompts are interactive and enable instruction and user feedback to be applied to the one or more identified solutions.

5. The computer-implemented method of claim 1, further comprising:
   guiding, by the computing device, the user through one or more solution implementations via responsive prompts, annotations, or step by step instructions, wherein the solution implementations are displayed and output on the computing device.

6. The computer-implemented method of claim 1, further comprising:
   generating a ranked list of visualizations based on a type and a criticality of the identified defects; and
   outputting the ranked list of visualizations, wherein the ranked list displays the generated visualizations based on predetermined parameters.

7. The computer-implemented method of claim 1, wherein the created visualization of the selected codebase enables one or more users to perform mobility between two or more applications.

8. A computer system for generating a visualization of a developed code in a Virtual Reality (VR) integrated development environment (IDE), the computer system comprising:
   one or more computer processors;
   one or more computer readable storage devices;
   program instructions stored on the one or more computer readable storage devices for execution by at least one of the one or more computer processors, the stored program instructions comprising:

program instructions to uniquely identify a codebase of a developed code through a functionality of the codebase and a code analysis tool to identify sections of the codebase that correlate to a particular action;

program instructions to assign a unique identification number to the codebase based on one or more identified predetermined details;

program instructions to create an integrated view of a developed code during integration testing based on received artificial intelligent enabled IDE;

program instructions to execute a test case simulation during an integrated visualization of the developed code in a virtual reality environment;

program instructions to create a comparative visualization of the developed code based on one or more test results from the test case simulation in the VR environment to identify errors in the developed code, wherein the comparative visualization of the developed code enables a user to visually observe and understand one or more problems in the developed code during the integration testing, and wherein the comparative visualization is data processing visualized as a pipeline arrangement and a data flow is represented by a flow of fluid through the pipeline arrangement and server management is depicted as a bookshelf;

program instructions to create a visualization of a selected code from the developed code with respect to an entire application landscape based on received data from one or more upstream and downstream applications, wherein the visualization demonstrates an application integration depicted by an exemplary system or object that depicts features and attributes of the application integration;

program instructions to identify one or more problematic areas and areas where fixing is required based on types of defect and criticality of the defect in the developed code;

program instructions to display, by a computing device, the visualization of the selected code, wherein the visualization of the selected code depicts the one or more identified problematic areas;

program instructions to apply one or more identified solutions to the one or more identified problematic areas in the developed code and dynamically updating the code base, wherein applying one or more identified solutions comprise: scheduling changes, correcting integration sequence, changing of configurations, and fixing of defects; and program instructions to create an end-to-end integration of a first application to one or more second application in the application landscape.

9. The computer system of claim 8, further comprising:
program instructions to create one or more visualizations of the developed code based upon previously stored experiences of users, wherein the previously stored experiences comprise various types of visualization, wherein the various types of visualizations comprise predetermined and custom visualizations.

10. The computer system of claim 8, wherein the artificial intelligent enabled IDE analyzes functional and non-functional specifications, test cases, acceptance criteria and the developed code, unit testing results, and one or more application logs, and wherein based on the analysis, creates a comparative visualization of the entire developed code so that the developer can have a holistic integrated view of the developed code in the visualization.

11. The computer system of claim 8, further comprising:
program instructions to outputting, by a user interface, the one or more identified solutions to the user, wherein outputting comprises:
program instructions to display, by the user interface, one or more responsive prompts to the user, wherein the one or more responsive prompts are interactive and enable instruction and user feedback to be applied to the one or more identified solutions.

12. The computer system of claim 8, further comprising:
program instructions to guide, by the computing device, the user through one or more solution implementations via responsive prompts, annotations, or step by step instructions, wherein the solution implementations are displayed and output on the computing device.

13. The computer system of claim 8, further comprising:
program instructions to generate a ranked list of visualizations based on a type and a criticality of the identified defects; and
program instructions to output the ranked list of visualizations, wherein the ranked list displays the generated visualizations based on predetermined parameters.

14. The computer system of claim 8, wherein the created visualization of the selected codebase enables one or more users to perform mobility between two or more applications.

15. A computer program product for generating a visualization of a developed code in a Virtual Reality (VR) integrated development environment (IDE), the computer program product comprising:
one or more computer readable storage media and program instructions stored on the one or more computer readable storage media, the stored program instructions comprising:
program instructions to uniquely identify a codebase of a developed code through a functionality of the codebase and a code analysis tool to identify sections of the codebase that correlate to a particular action;
program instructions to assign a unique identification number to the codebase based on one or more identified predetermined details;
program instructions to create an integrated view of a developed code during integration testing based on received artificial intelligent enabled IDE;
program instructions to execute a test case simulation during an integrated visualization of the developed code in a virtual reality environment;
program instructions to create a comparative visualization of the developed code based on one or more test results from the test case simulation in the VR environment to identify errors in the developed code, wherein the comparative visualization of the developed code enables a user to visually observe and understand one or more problems in the developed code during the integration testing, and wherein the comparative visualization is data processing visualized as a pipeline arrangement and a data flow is represented by a flow of fluid through the pipeline arrangement and server management is depicted as a bookshelf;
program instructions to create a visualization of a selected code from the developed code with respect to an entire application landscape based on received data from one or more upstream and downstream applications, wherein the visualization demonstrates an application integration depicted by an exemplary system or object that depicts features and attributes of the application integration;

program instructions to identify one or more problematic areas and areas where fixing is required based on types of defect and criticality of the defect in the developed code;

program instructions to display, by a computing device, the visualization of the selected code, wherein the visualization of the selected code depicts the one or more identified problematic areas;

program instructions to apply one or more identified solutions to the one or more identified problematic areas in the developed code and dynamically updating the code base, wherein applying one or more identified solutions comprise: scheduling changes, correcting integration sequence, changing of configurations, and fixing of defects; and program instructions to create an end-to-end integration of a first application to one or more second application in the application landscape.

16. The computer program product of claim 15, further comprising:

program instructions to create one or more visualizations of the developed code based upon previously stored experiences of users, wherein the previously stored experiences comprise various types of visualization, wherein the various types of visualizations comprise predetermined and custom visualizations.

17. The computer program product of claim 15, wherein the artificial intelligent enabled IDE analyzes functional and non-functional specifications, test cases, acceptance criteria and the developed code, unit testing results, and one or more application logs, and wherein based on the analysis, creates a comparative visualization of the entire developed code so that the developer can have a holistic integrated view of the developed code in the visualization.

18. The computer program product of claim 15, further comprising:

program instructions to outputting, by a user interface, the one or more identified solutions to the user, wherein outputting comprises:

program instructions to display, by the user interface, one or more responsive prompts to the user, wherein the one or more responsive prompts are interactive and enable instruction and user feedback to be applied to the one or more identified solutions.

19. The computer program product of claim 15, further comprising:

program instructions to guide, by the computing device, the user through one or more solution implementations via responsive prompts, annotations, or step by step instructions, wherein the solution implementations are displayed and output on the computing device.

20. The computer program product of claim 15, further comprising:

program instructions to generate a ranked list of visualizations based on a type and a criticality of the identified defects; and program instructions to output the ranked list of visualizations, wherein the ranked list displays the generated visualizations based on predetermined parameters.

\* \* \* \* \*